C. FRENCH.
Car-Springs.

No. 200,860.    Patented March 5, 1878.

Witnesses:
S. J. Masson
W. R. Edelen.

Inventor:
Carlos French
by E. E. Masson
atty

UNITED STATES PATENT OFFICE.

CARLOS FRENCH, OF SEYMOUR, CONNECTICUT.

IMPROVEMENT IN CAR-SPRINGS.

Specification forming part of Letters Patent No. 200,860, dated March 5, 1878; application filed August 11, 1877.

*To all whom it may concern:*

Be it known that I, CARLOS FRENCH, of Seymour, in the county of New Haven and State of Connecticut, have invented certain new and useful Improvements in Springs for Railroad-Cars; and that the following is a full, clear, and exact description of the same, reference being had to the accompanying drawings, making a part of this specification, in which—

Figure 1:
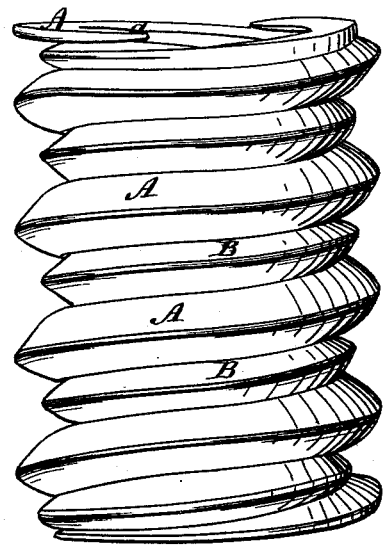
Figure 2:
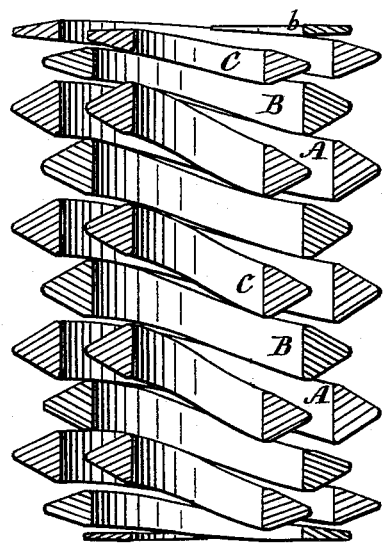
Figure 3:
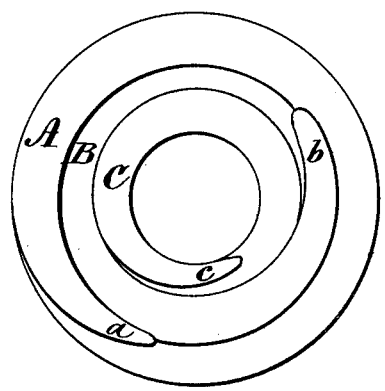

Figure 1 represents a side view of a nest of my improved coiled springs. Fig. 2 represents a vertical section of the same. Fig. 3 represents a top view of the same.

My invention relates to coiled springs suitable for railroad-cars, in which lightness, strength, and elasticity should be combined, and at the same time of such form that if arranged in nests of coils of different sizes they will mutually sustain one another and prevent rupture under the heaviest load.

My invention consists in coiled springs made of bars triangular in form, and having equal sides, by pressing and condensing the metal of which said springs are made through the forming-rolls a number of times, reversing each time the position in which they pass through the rolls without danger of distorting the fibers of the metal, compressing it from each side toward the center, rendering said springs more compact, homogeneous, and elastic than could be accomplished by any other form.

In the drawings, A B C represent three coiled springs of different diameters, placed one inside of the other, to form a nest of springs as they are ordinarily used upon railroad-cars, where they have to support heavy loads, and are submitted to continuous vibrations. This is found to be the best form to resist and obviate the danger of breakage of any individual spring. Each spring is made tapering flatwise at the ends *a b c*, to rest evenly upon its bearings after it is coiled. In coiling it a mandrel of the required size is used, and the triangular steel rod is wrapped around it, with one of its three faces adjacent to the mandrel, the two other faces forming an angle projecting on the outside of the spring.

When using two or more springs to form a nest, the diameter of each is different, but the pitch of the screw or coil is parallel and concentric, the diameter of the internal spring being generally such that the outer angle of the inner spring will project over the vertical side or inside of the larger spring; in other words, the inner spring will be screwed loosely into the outer one, leaving space between each to give play to the springs, but under a too heavy load this space will be closed by the coils of each spring resting upon its fellow, and all danger of breakage obviated. To produce this result the form of the steel bar out of which the spring is made should be triangular in cross-section, and with equal sides to obtain the same adhesion on each side.

The bottom of the grooves on the forming-rolls may be slightly rounded, so that fins will not be produced on the angles of the triangular bars.

I am aware that coiled springs have been made of bars of various forms in cross-section, such as rectangular, elliptic, round, half-round, &c.; but they do not fully meet the conditions of strength and elasticity in a spring for railroad-cars as the above-described spring.

Having thus fully described my invention, I claim—

A spring or nest of springs composed of bars triangular in cross-section, and having equal sides, coiled into a spiral form, substantially as and for the purpose described.

CARLOS FRENCH.

Witnesses:
JOHN W. ROGERS,
S. C. TUCKER.